(12) United States Patent
Kobayashi et al.

(10) Patent No.: US 7,561,573 B2
(45) Date of Patent: Jul. 14, 2009

(54) NETWORK ADAPTOR, COMMUNICATION SYSTEM AND COMMUNICATION METHOD

(75) Inventors: Shinji Kobayashi, Kawasaki (JP); Tadafusa Niinomi, Kawasaki (JP); Yuichiro Ajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 523 days.

(21) Appl. No.: 11/221,972

(22) Filed: Sep. 9, 2005

(65) Prior Publication Data

US 2006/0215691 A1 Sep. 28, 2006

(30) Foreign Application Priority Data

Mar. 23, 2005 (JP) ............... 2005-084002

(51) Int. Cl.
*H04L 12/28* (2006.01)
*H04J 3/24* (2006.01)

(52) U.S. Cl. ...................... 370/392; 370/474

(58) Field of Classification Search ............ 370/389, 370/392, 400, 401, 470, 471, 474
See application file for complete search history.

(56) References Cited

U.S. PATENT DOCUMENTS

| 6,032,190 | A * | 2/2000 | Bremer et al. ............ 709/238 |
|---|---|---|---|
| 6,401,171 | B1 * | 6/2002 | Klein et al. ............... 711/118 |
| 6,480,489 | B1 * | 11/2002 | Muller et al. .............. 370/389 |
| 6,483,804 | B1 * | 11/2002 | Muller et al. .............. 370/230 |
| 6,678,746 | B1 * | 1/2004 | Russell et al. ............... 710/1 |
| 6,700,888 | B1 * | 3/2004 | Jonsson et al. ............. 370/392 |
| 6,963,570 | B1 * | 11/2005 | Agarwal ............... 370/395.32 |
| 2001/0053148 | A1 * | 12/2001 | Bilic et al. ................. 370/389 |
| 2004/0184457 | A1 * | 9/2004 | Gregorio et al. ........... 370/392 |
| 2005/0223134 | A1 * | 10/2005 | Vasudevan et al. .......... 710/22 |
| 2006/0072564 | A1 * | 4/2006 | Cornett et al. ............. 370/389 |

FOREIGN PATENT DOCUMENTS

| JP | 2002-84289 | 3/2002 |
|---|---|---|
| JP | 2003-87255 | 3/2003 |
| WO | 03/003673 | 1/2003 |

* cited by examiner

*Primary Examiner*—Hong Cho
(74) *Attorney, Agent, or Firm*—Fujitsu Patent Center

(57) ABSTRACT

A header processing unit divides each received packet into a header section and a data section. Adapter memory stores each packet. A packet reassembly processing unit generates a new header, based on the header section of each of the plurality of packets and notifies a host computer of the new header and a plurality of pieces of location information indicating the storage position of each of a plurality of data sections stored in the adapter memory. A DMA control unit reads the plurality of data sections from the adapter memory, according to a transfer instruction generated in the host computer, using the location information and transfers it to the host computer.

15 Claims, 11 Drawing Sheets

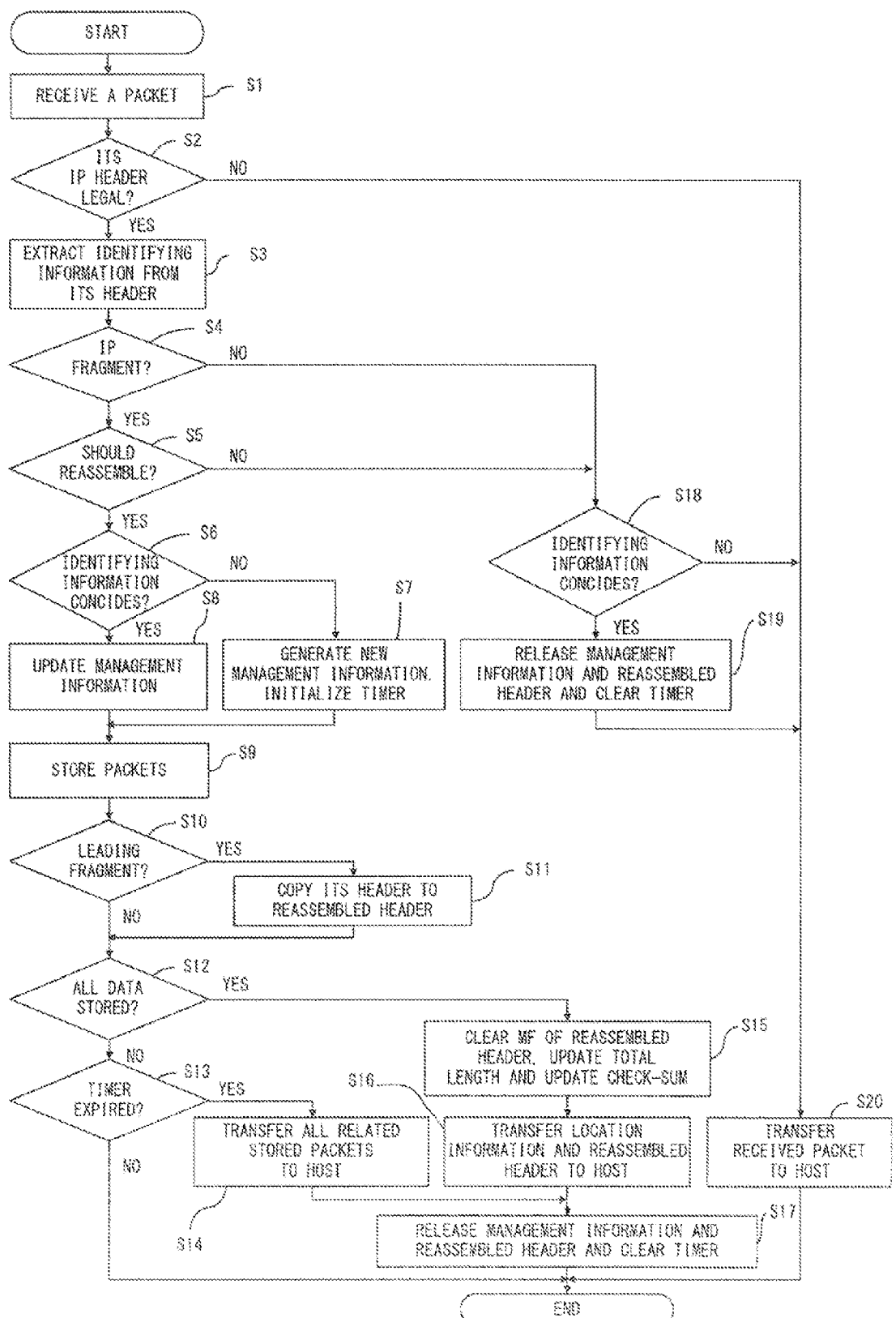
F I G. 9

NETWORK ADAPTOR, COMMUNICATION SYSTEM AND COMMUNICATION METHOD

BACKGROUND OF THE INVENTION

1. Field of the Invention

The present invention relates to a technology for transferring packets received via a network to a host computer.

2. Description of the Related Art

How to reduce load increasingly put on a host computer for conducting communication with the improvement in speed of networks is a recent problem. Particularly, in the combination of a widely used transmission control protocol (TCP)/internet protocol (IP) and a socket application interface (socket API), the reduction of the load of a host computer, put on its protocol processing for each packet and memory-to-memory copy is currently a problem.

Every time a packet is transmitted/received, processes, such as the generation and analysis of a header and the like are performed. In order to further improve communication speed, it is preferable to increase the size of each packet to be transmitted as much as possible to shorten time needed for these processes. However, in a network, such as Ethernet (trademark) or the like, the maximum length (maximum transmit unit (MTU)) of each packet is specified. For example, generally it is 1,500 bytes in normal Ethernet, and approximately nine kilobytes even if an extension function called "jumbo frame" is used. In a recent high-speed network, particularly there is a possibility that a protocol processing for each packet may become a bottleneck.

As a technology for reducing the load of the processing for each packet, for example, a technology for grouping packet information about a header and the like when receiving a packet from a communication network to reduce the load put on the CPU of a host computer is disclosed (for example, Patent reference 1). For another example, a technology for extracting a plurality of packets sharing a route from their destination addresses, grouping a plurality of such packets and transmitting a grouped packet containing information about each packet is also disclosed (for example, Patent reference 2). Furthermore, for another example, a technology for dividing a packet at a TCP level on the transmitting side and combining the divided packets is also disclosed (for example, Patent reference 3).

As another technology for improving communication speed, there is a technology for shortening the time needed for memory-to-memory copy, of a host computer disclosed in the International Application No. PCTJP04/12006. According to such a technology, on the transmitting side of a packet, direct memory access (DMA) transfer is applied to the data section of the packet and the data section is transferred from the user space to the buffer (transmitting buffer) of a network adapter. Data stored in the buffer of the network adapter is transmitted to the network, using the generated header. In a network adapter on the packet receiving side, when transferring the packet received from the network to the host computer, the header and the data section are separated, and firstly the generated header is transferred to the host computer. The software of the host computer applies a protocol processing to the header section, and after the user space of a data destination is determined, the data section is transferred.

Patent reference 1: Japanese Patent Application No. 2003-87255 (Abstract, FIGS. 1 and 2 and paragraph 0035)

Patent reference 2: Japanese Patent Application No. 2003-003673 (Abstract and claim 1)

Patent reference 3: Japanese Patent Application No. 2002-84289 (Abstract, FIG. 1 and paragraph 0008)

It is difficult to receive each packet in such a way that each packet can be stored in the memory of its own device as one continuous packet when the network adapter receives packets to be transferred to the host computer, from the network. Specifically, it is difficult to implement immediate disassembly of the packet arriving from the network and storing the data section in an appropriate position after determining in what part of the entire packet the data section is located, as the memory-to-memory copy causes overhead. In this case, discontinuous packets are transmitted to the memory of the network adapter and are transferred to the memory of the host computer in such way as to form one continuous area. Since such a technology is a general technology called "scatter gather DMA", its description is omitted here.

The transfer to the host computer of the data section stored in the network adapter is instructed by the host computer. In order to realize this, the host computer must recognize where in the memory of the network adapter each data section exists. In order for the host computer to realize the transfer process without recognizing the location of the data section, a handle must be issued to a packet composed of the data section in the network adapter and the correspondence between this handle and each data section must be managed in the network adapter. This incurs a management cost on the network adapter side.

Alternatively, when transferring the data section of the packet discontinuously stored in the memory of the network adapter to the host computer, information about a leading address and length of each stored data section must be notified from the network adapter to the host computer. In a conventional DMA transfer, such information is notified to the host computer together with DMA descriptor. However, since the length of the DMA descriptor is fixed, the larger the amount of data of a received packet, the greater the number of sets of the leading address and data length. For example, if packets received from the 1,500-byte MTU Ethernet are grouped every 64 kilobytes, the number of sets of the leading address and data length becomes 44. An area for storing such much information must be allocated for one DMA descriptor.

SUMMARY OF THE INVENTION

It is an object of the present invention to provide a technology capable of suppressing the cost of a network adapter and improving the efficiency in use of memory by canceling memory-to-memory copy in a host computer while keeping the protocol processing of the host computer simple, when transferring packets received from a network to the host computer.

The network adapter of the present invention transfers a plurality of packets received via the network to the host computer. The network adapter comprises a separation unit for dividing each received packet into a header section and a data section, a storage unit for storing each packet divided by the separation unit, a generation unit for generating a new header, based on the header section of each of the plurality of packets, a notification unit for notifying the host computer of the new header and a plurality of pieces of location specifying information indicating the storage position of each of a plurality of data sections stored in the storage unit and a transfer unit for reading the plurality of data sections from the storage unit and transferring said data sections to the host computer, according to a transfer instruction generated using the location specifying information in the host computer.

In the network adapter, the plurality of received packets is logically organized into one packet composed of a new header and a plurality of data sections. The new header and location specifying information are transferred to the host computer separately from the data section. The data section is transferred to the prescribed area of the memory of the host computer according to the transfer instruction generated using the location specifying information in the host computer. The host computer determines the above mentioned transfer destination by performing protocol processing based on the new header and makes the transfer instruction in such a way that the plurality of data sections are transferred to continuous area of the transfer destination in the memory of the host computer.

In the network adapter, the notification unit can also transmit the new header and location specifying information to the kernel space of the memory in the host computer, and the transfer unit can also transfer the plurality of data sections to the user space of the memory in the host computer. In this case, there is no need to transfer the data section from the kernel space to user space.

The notification unit can also notify the host computer of the number of the plurality of pieces of location specifying information in addition to the new header and the plurality of pieces of location specifying information. In this case, the host computer can recognize the stored place of each piece of the location specifying information or new header, based on the number of the location specifying information.

According to the present invention, a plurality of packets is logically organized into one packet and is transferred to a host computer without providing a network adapter with a complex buffer management function. The efficiency in use of memory can also be improved in the host computer.

BRIEF DESCRIPTION OF THE DRAWINGS

FIG. 9 is a flowchart showing the operation of the network adapter which received a packet.

DESCRIPTION OF THE PREFERRED EMBODIMENTS

The preferred embodiments of the present invention are described in detail below with reference to the drawings.

Figure 1:
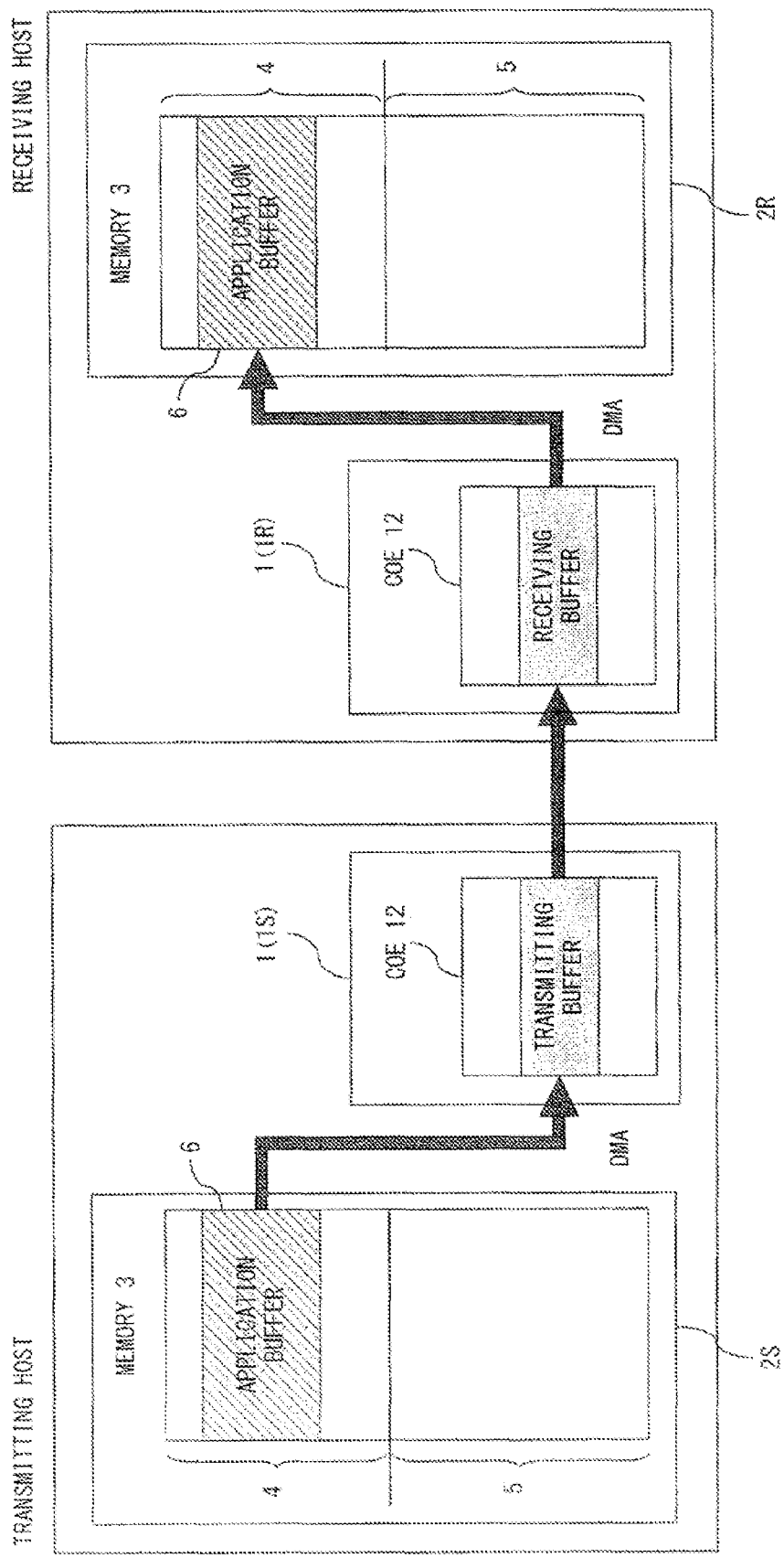
FIG. 1 shows the basic flow of packets transmitted/received in the communication system of the present invention.

FIG. 1 shows the basic flow of packets transmitted/received in the communication system 10 of the present invention. A host computer 2S on the transmitting side and a host computer 2R on the receiving side are connected via a network adapter 1 (1S) on the transmitting side and a network adapter 1 (1R) on the receiving side. The memory 3 of the host computer 2 has a user space 4 and a kernel space 5, and, in this example, the transmission/reception of data (packets) in the user space 4 is studied. Specifically, the data of an application buffer 6, located in the user space 4 is transmitted/received using the copy offload engine (COE) technology set forth in the International Application No. PCTJP04/12006 of the present invention.

The data in the application buffer 6 of the host computer 2S on the transmitting side is transferred to the transmitting buffer on the transmitting side by the COE technology without passing through the kernel space 5 and is transmitted to the network adapter 1(1R) as packets (fragments) divided for each MTU size by the network adapter 1(1S) on the transmitting side. Then, the data received by the network adapter 1(1R) is transferred to the user space 4 of the host computer 2R on the receiving side without passing through the kernel space 5. The transfer process of a packet to the user space 4 on the receiving side is realized by the host computer 2 transferring the data of the receiving buffer in the network adapter 1. As described in Background of the Invention, the protocol processing is performed by the software of the host computer.

Figure 2:
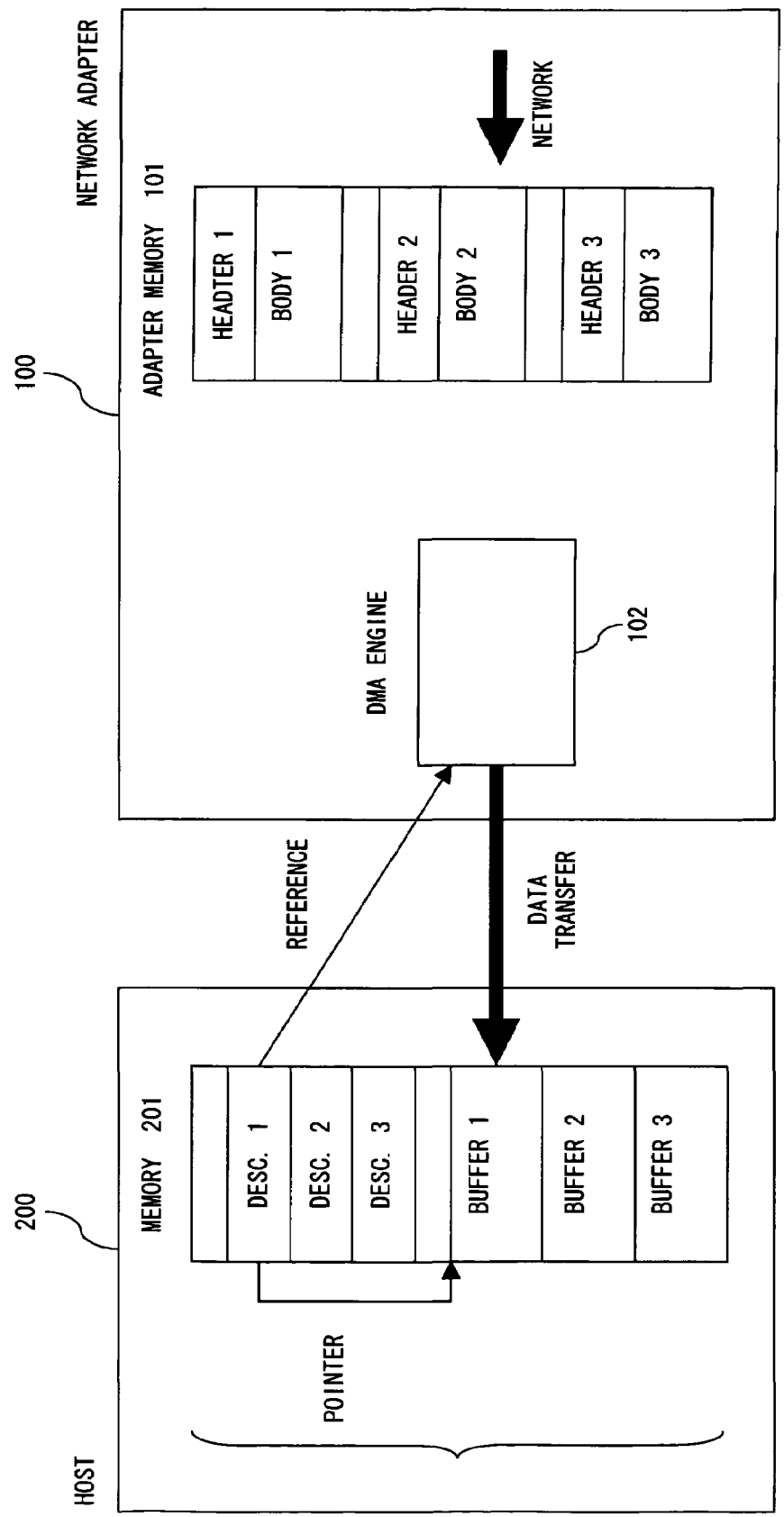
FIG. 2 shows the DMA interface for performing a general DMA transfer.

FIG. 2 shows the DMA interface for performing a general DMA transfer. Before describing the operation of the network adapter 1 of the preferred embodiment, the operation of a network adapter in a general DMA transfer is described with reference to FIG. 2.

Packets received via a network are discontinuously stored in adapter memory (buffer memory) 101 in arriving order to the network adapter 100. The packets stored in the adapter memory of the network adapter 100 are DMA-transferred to the memory (host memory) 201 of the host computer 200, using a DMA descriptor.

The memory 201 of the host computer 200 receiving packets from the network adapter 100 comprises a descriptor area and a receiving buffer. The descriptor area stores descriptors used for DMA transfer. The receiving buffer temporarily stores packets DMA-transferred from the network adapter 100.

The descriptors disposed in the descriptor area comprise an array or a list. The descriptor stores control information for reading packet data, such as the physical address of the receiving buffer, a command from the host computer 200 to the network adapter 100, the length and status of the received packet and the like. By the status, being one of the control information, it is indicated whether a plurality of packets transferred from the network are all received or not. The control information, such as the length and status of the received packet or the like is updated after the reception of packets by the network adapter 100 is completed.

Figure 3:
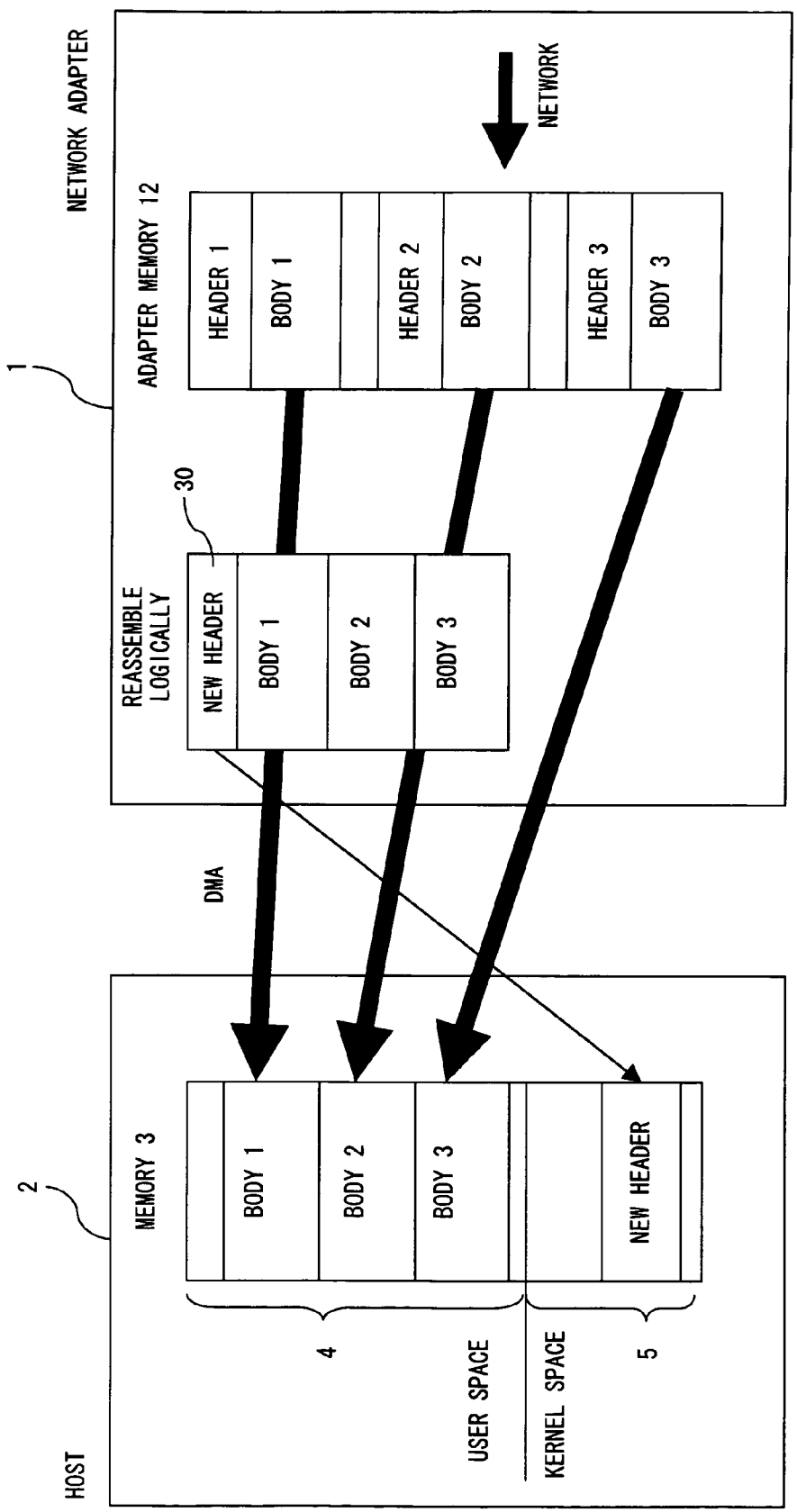
FIG. 3 shows the basic operation of transferring received packets to the host computer, using the network adapter of the preferred embodiment.

FIG. 3 shows the basic operation of transferring received packets to the host computer 2, using the network adapter 1 of the preferred embodiment. In this preferred embodiment, when a packet received from the network is discontinuously stored in the adapter memory 12 of the network adapter 1, the process of reassembling them into continued packets is not performed on the network adapter 1 side but the process of logically grouping them into one packet is performed, based on the headers of a plurality of received packets. Then, the header of the logically generated packet and a plurality of data section extracted from the plurality of received packets are transferred to the host computer 2. The host computer 2 performs a protocol processing, based on the header of the logically generated packet. In the following description, the new header to be transferred to the host computer 2, logically generated from the plurality of received packets is called reassembled header 30.

The reassembled header 30 transferred from the network adapter 1 is stored in the kernel space 5 of the host memory 3 in the host computer 2. The reassembled header 30 is processed by protocol processing software of the host computer 2 and the transfer destination of the data section of the packet is determined. In this case, the transfer destination of the data section of a packet is an area in the user space 4 of the host memory 3. In this preferred embodiment, no memory-to-memory copy is performed in the host computer 2, and the data section of the packet in the adapter memory 12 of the network adapter 1 is directly DMA-transferred to the user space 4 of the host computer 2. The storage position of the data section in the adapter memory 12 is transmitted beforehand from the network adapter 1 to the host computer 2 as the location information (location specifying information) of the data section.

Figure 4:
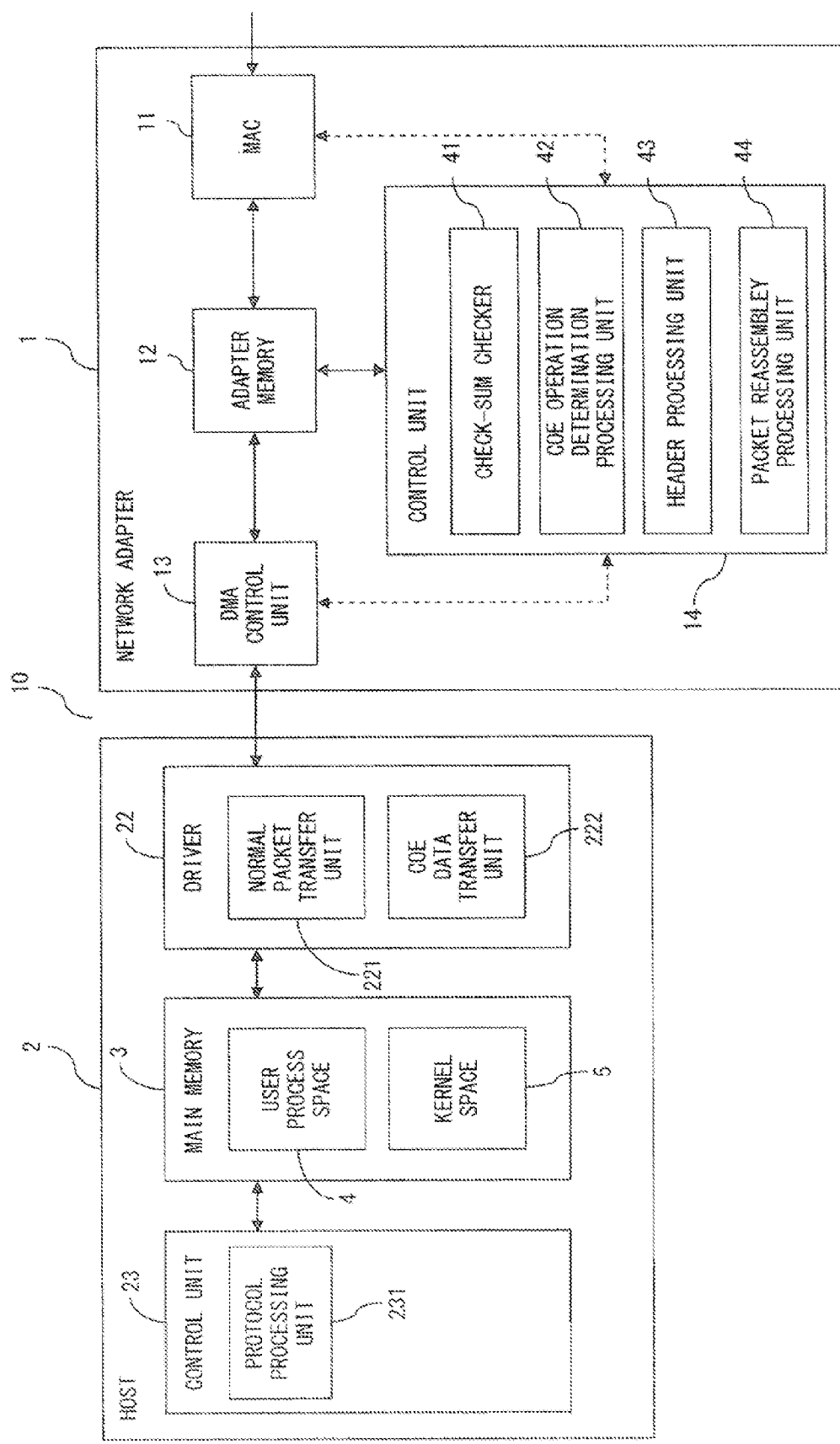
FIG. 4 shows the configuration of the communication system composed using the network adapter of the preferred embodiment.

FIG. 4 shows the configuration of the communication system 10 composed using the network adapter 1 of this preferred embodiment. In this preferred embodiment, as described above, the communication system 10 comprises the network adapter 1 and the host computer 2. The function of each device when specifically performing the operation outlined in FIG. 3 is described below with reference to FIG. 4.

The network adapter 1 comprises a media access control (MAC) 11, a receiving buffer (adapter memory) 12, a DMA control unit 13 and a control unit 14. The MAC 11 is located in the lower order of the data link layer and relates to the transmission/reception of frames, being the transmitting/receiving unit of data. Specifically, the MAC 11 specifies whether data is transmitted/received according to a prescribed method, such as a frame format, an error detection method and the like. The receiving buffer 12 stores packets received from the network and packets to be transmitted from the host computer 2 to the network, as described above. The DMA control unit 13 performs DMA transfer according to a command (DMA descriptor) generated by the host computer 2. The control unit 14 controls packets to be transmitted/received.

The control unit 14 of the network adapter 1 comprises a check-sum checking mechanism unit 41, a COE operation determination processing unit 42, a header processing unit 43 and a packet reassembly processing unit 44. The check-sum checking mechanism unit 41 calculates a check sum used to check whether a packet to be transmitted/received is broken or not when transmitting a packet and checks using the check sum when receiving a packet. The COE operation determination processing unit 42 determines whether the transfer of packets using the reassembled header 30 should be performed or not, based on the size of a divided packet (fragment) or the like. The header processing unit 43 generates a reassembled header 30. The packet reassembly processing unit 44 generates information needed to array data in the order before division in the host computer 2.

The host computer 2 comprises memory 3, a driver 22 and a control unit 23. The memory 3 stores the reassembled header 30 received from the network adapter 1 and the data section of a packet, as described above. The memory 3 comprises the user space 4 and the kernel space 5.

The driver 22 controls the transmission/reception of packets to/from the network adapter 1. The driver 22 comprises a normal packet transfer unit 221 and a COE data transfer unit 222. The normal packet transfer unit 221 performs normal packet transfer. The COE data transfer unit 222 transmits/receives the data section of a packet stored in the receiving buffer 12 of the network adapter 1, based on the reassembled header 30.

The memory 3 comprises the user space 4 and the kernel space 5 as described above. Since the user space 4 and kernel space 5 are already described above, their descriptions are omitted here.

The control unit 23 of the host computer 2 controls the transmission/reception of packets in the host computer 2 as the operation of the present invention. The control unit 23 comprises a protocol processing unit 231. The protocol processing unit 231 activates software for performing the protocol processing, based on the reassembled header 30 received from the network adapter 1.

Figure 5:
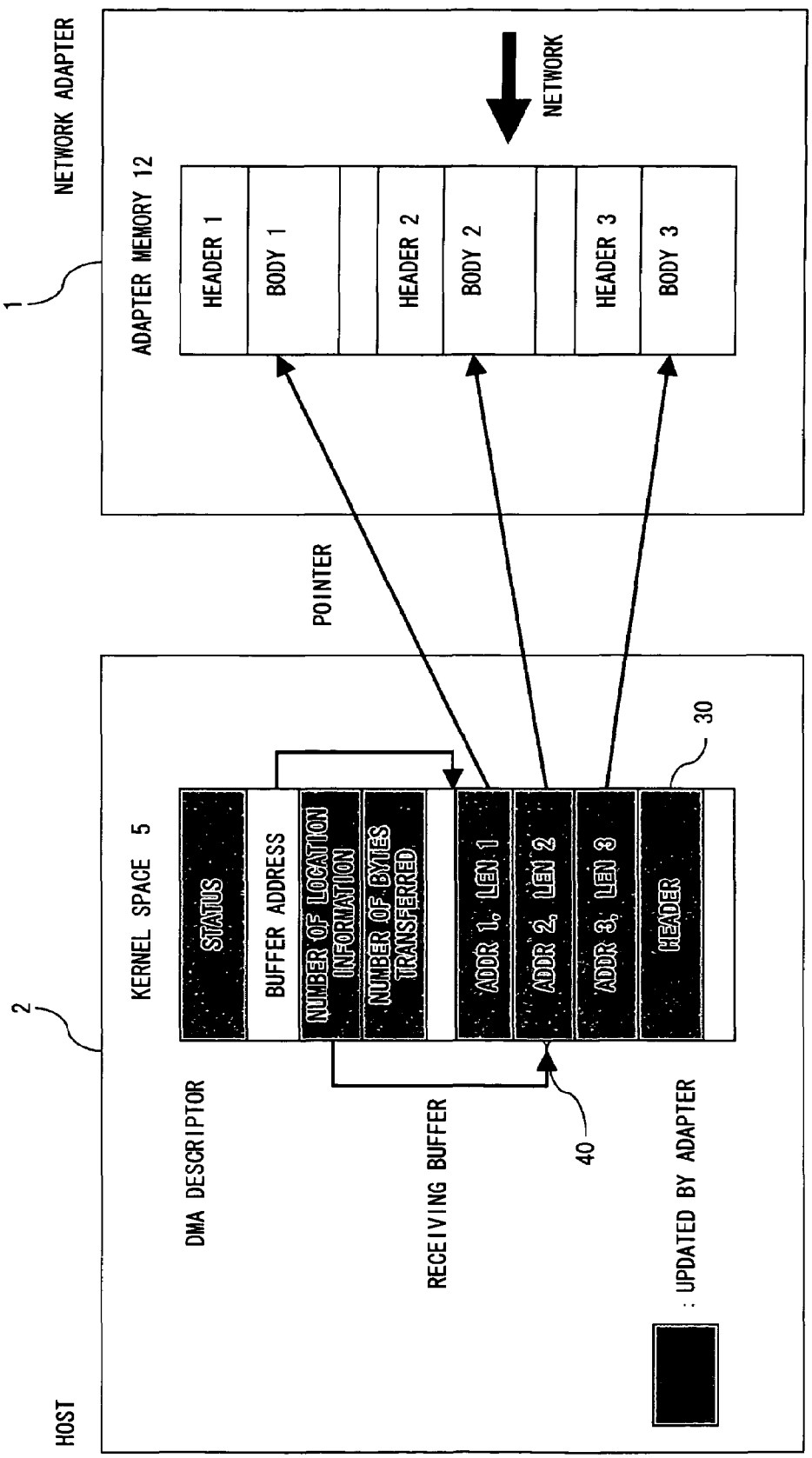
FIG. 5 shows that the location information of the data section and reassembled header of a packet are stored in the receiving buffer of the host computer in the communication system of the preferred embodiment.

FIG. 5 shows that the location information 40 of the data section and reassembled header of a packet are stored in the receiving buffer of the host computer 2 in the communication system 10 of the preferred embodiment. The upper and lower sections of the kernel space 5 of the host computer shown in FIG. 5 show a descriptor area and a receiving buffer, respectively.

In FIG. 5, the receiving buffer area stores the reassembled header 30 and location information 40 which are transmitted from the network adapter 1. In this case, the location information 40 is, for example, composed of the leading address and length of each data section in the adapter memory 12 of the network adapter 1. The reassembled header 30 and location information 40 are transferred from the network adapter 1 to the host computer 2 according to a header transfer DMA descriptor, which is described later.

The host computer 2 generates data transfer descriptor using the location information 40. In this case, the header transfer descriptor in FIG. 5 contains the information such as the physical address of the receiving buffer, the length and status of the received packet and the like, as described earlier with reference to FIG. 2.

The status in the descriptor area in FIG. 5 is already described with reference to FIG. 2. The leading address of the receiving buffer is stored in the buffer address. The number of location information 40 in the adapter memory 12, that is, information about the number of data sections stored in the adapter memory 12 is stored in the number of location information. Then, the host computer 2 generates DMA descriptor for data transfer according to the location information 40. The network adapter 1 reads the data section of a packet from the adapter memory 12 according to the DMA descriptor and transfers it to the host computer 2. The number of bytes of the reassembled header 30 and location information 40, which are transferred to the receiving buffer, is stored in the number of transfer bytes.

Although in FIG. 5, as to information stored in the receiving buffer, the location information 40 is set at the top and then the reassembled header 30 is set, it is not limited to this. For example, after setting the leading address of location information 40 and the reassembled header 30, the host computer 2 can also notify the network adapter 1 of its setting value. Alternatively, for example, the storage area of each of the location information 40 and reassembled header 30 can be determined, such as the reassembled header 30 is stored at the top of the receiving buffer, and location information 40, the end of the receiving buffer.

In this way, in the communication system of the preferred embodiment, the location information 40, the number of which corresponds with the number of a plurality of received packets, is generated in the network adapter 1. When the network adapter 1 notifies the host computer 2 of the plurality of pieces of location information 40, the number of the location information 40 is also notified to the host computer 2. Therefore, if it is assumed that the data length of each piece of location information 40 is the same, the host computer 2 can calculate the storage address of another arbitrary piece of location information (and also the storage address of the reassembled header 30, as requested) even if it does not recognize the storage address of each piece of location information 40 in the receiving buffer as long as it recognizes only the storage address of starting location information 40.

Figure 6:
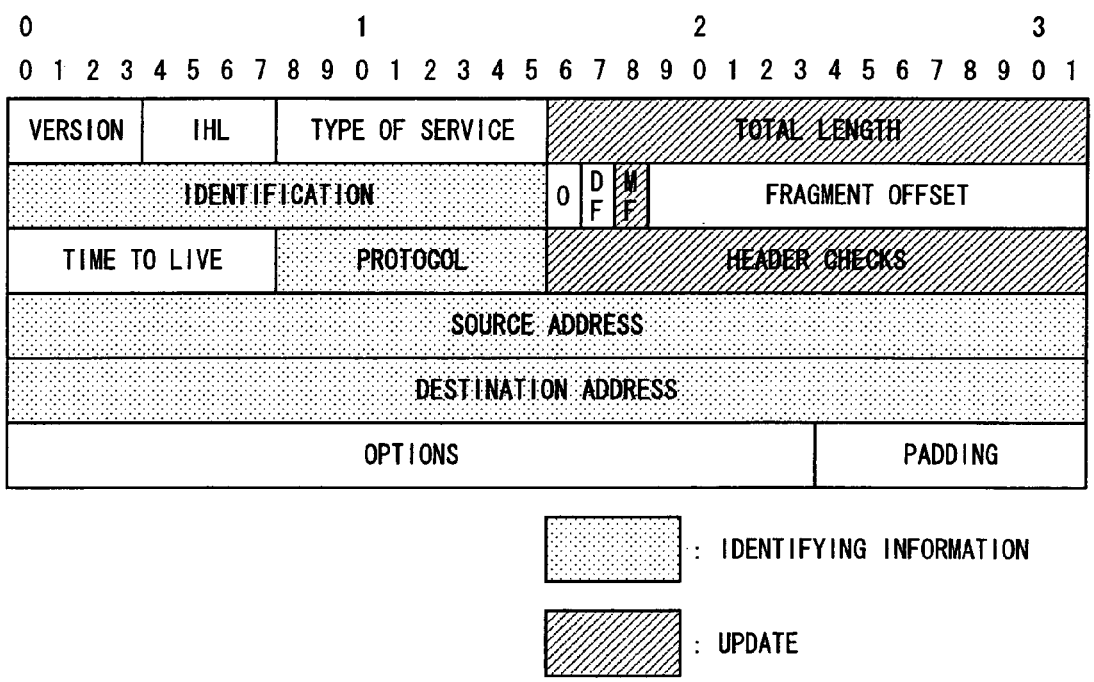
FIG. 6 shows an example of the structure of the reassembled header.

FIG. 6 shows an example of the structure of the reassembled header 30. In this preferred embodiment, the reassembled header 30 is generated based on the IP header of a divided packet (fragment) received from the network. Referring to the IP header of each received fragments, the network adapter 1 generates a reassembled header 30 which is used to transfer fragments, with the same transmitting source, destination, identifier and the like, to the host computer 2 as one organized packet. After applying a protocol processing to the reassembled header 30 as one packet, the data section of each fragment is directly transmitted to the user space 4. In this preferred embodiment, in order to distinguish fragments to group from the other fragments, information about the transmitting source or the like of a packet is used as identifying information. In FIG. 6, "identification", "protocol", "source address" and "destination address" correspond to this.

The same value for all divided packets is stored in the "identification". The "protocol" is the protocol number for data stored in the IP packet. The IP addresses of transmitting source and destination of each packet, respectively are stored in the "source address" and "destination address".

Each value of the identifying information is set based on the header of each packet received from the network. As the header, for example, the IP header of a starting fragment is used. It is determined whether the received packet is a starting fragment, by referring to the information of "fragment offset" (location in original data) of a header. If the received packet is the starting fragment, "0" is stored as its value. Therefore, it can be distinguished from the fragments other than the starting one.

The "total length of a packet", "more fragment flag (MF)" and "header check-sum" of a plurality of pieces of information constituting the reassembled header 30 are updated when all fragments are stored in the adapter memory 12. The total length can be calculated based on the header length (IHL) of a starting fragment, the header length (IHL), total length and fragment offset of an end fragment. The fragment offset stores the offset values of data before one packet is divided into a plurality of fragments, from the beginning.

In this preferred embodiment, in the MF, "0" is stored as a value indicating that divided fragments are organized by the network adapter 1 and transferred to the host computer 2 as one packet. Header check-sum is used to verify that the reassembled header 30 of the organized packet is not broken and is updated or set based upon the updated value by reassembling of the total length, etc. The result calculated by the check-sum of the normal IP header can be set as a header check-sum after updating the total length of the packet and the like.

Of the fields of the reassembled header 30 shown in FIG. 6, it is not always necessary to set "options" and "padding" as fields constituting a header. The other fields shown in FIG. 6 are used to check the legality of the packet. For example, if the version of an IP is "IPv4", "4" is stored as "version". As to "don't fragment flag (DF)", "0" and "1" are stored when a packet can be split and when no packet can be split, respectively. Therefore, if 1 is stored in the DF although a packet is split into fragments, it is determined that the packet is illegal. If 0 is stored in "time to live", similarly it is determined that the packet is illegal.

The identifying information of the reassembled header 30 shown in FIG. 6 is generated according to the identifying information of a starting fragment. Similarly, identifying information is stored in the header section of each of the fragments other than a starting one. In this preferred embodiment, fragments to be organized can be determined based on identifying information contained in the header of each fragment, and the network adapter 1 notifies the host computer 2 of information needed to transfer a plurality of the data sections to be organized into one packet. The information needed to transfer data section which is managed based on the header of each fragment is called management information. A method for managing the header information of each fragment in the network adapter 1 is described below.

Figure 7:
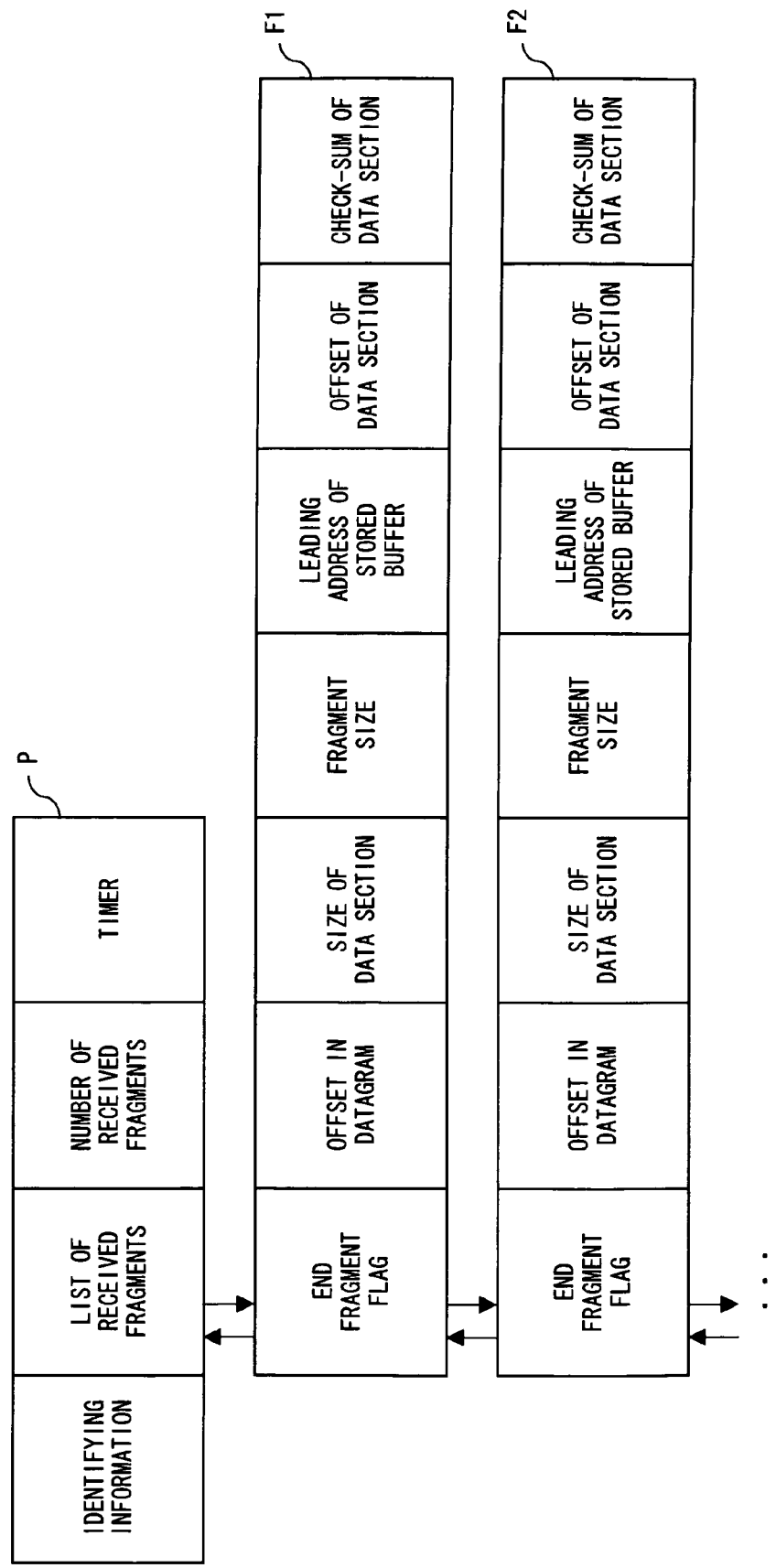
FIG. 7 shows an example of the data structure of management information.

FIG. 7 shows an example of the data structure of management information. Information about the storage address in the adapter memory 12, data length and the like of the data section of each fragment can be obtained by retrieving using the identifying information as a key.

In FIG. 7, the data structure shown in the upper section is called the packet management information P of one reassembled packet. The data structure shown in the middle is called the fragment management information F1 of a fragment stored in the adapter memory 12 in the first place. The data structures shown in the lower section are called the fragment management information F2 of a fragment stored in the adapter memory 12 in the second place and the fragment management information FN of a fragment stored in the adapter memory 12 in the N-th place, respectively. In this preferred embodiment, the fragment management information of each received fragment is managed using a list structure.

Information of each of fragments stored in the adapter memory 12 is sequentially added to the "list of received fragments" of the packet management information P and the "number of received fragments" is incremented. When the fragment management information F1 of a fragment stored in the first place is generated, the "timer" of the packet management information P is initialized, and a period for all fragments generated by splitting one packet to be stored in the adapter memory 12 is measured.

The fragment management information F1 stored in the adapter memory 12 in the first place is used as an example. In the "end fragment flag", the last fragment of the split data is set in such a way as to be distinguished from the other fragments. In the "offset in the datagram", the offset value from the beginning of a packet (datagram) before split, that is the value of the "fragment offset" in the header, are set. In the "size of data section", the length of the data section of each fragment, excluding its header is set. A position to be occupied when the fragments are organized into one packet is calculated using the "offset in the datagram" and the "size of data section". In this preferred embodiment, it is determined whether all the fragments constituting the packet are stored, using these three pieces of data.

In the "fragment size", the data length of the entire fragment is set. In the "leading address of stored buffer", the address of a stored location in the adapter memory 12 is set. In the "offset of data section", offset value from the leading address of the stored buffer is set. "Data section check-sum" is calculated based on the data of a fragment itself. "Data section check-sum" is used to check whether a packet (datagram) is broken or not.

The adapter memory 12 stores the header section and data section of each fragment. A value obtained by adding the "offset of data section" of each fragment to the "leading address of stored buffer" is the starting address of the data section of the fragment to be transmitted to the host computer 2. The starting address of the data section and the "size of data section", being the data length of the data section, are notified to the host computer 2 as the above-mentioned location information.

If the period measured by the "timer" of the packet management information P exceeds a predetermined period before storing all the fragments in the adapter memory 12, for example, each packet is restored from its header and data section stored in the adapter memory 12 using the "leading address of stored buffer" and "fragment size", and the restored packets are transferred to the host computer 2.

The partial check-sum of the data section of each fragment is grouped together and held as the fragment management information, and the check-sum of the packet can be calculated by adding all values of the partial check-sums when all the fragments are stored. The check-sum of transmission control protocol (TCP) and user datagram protocol (UDP) can be checked based on this check-sum.

Figure 8:
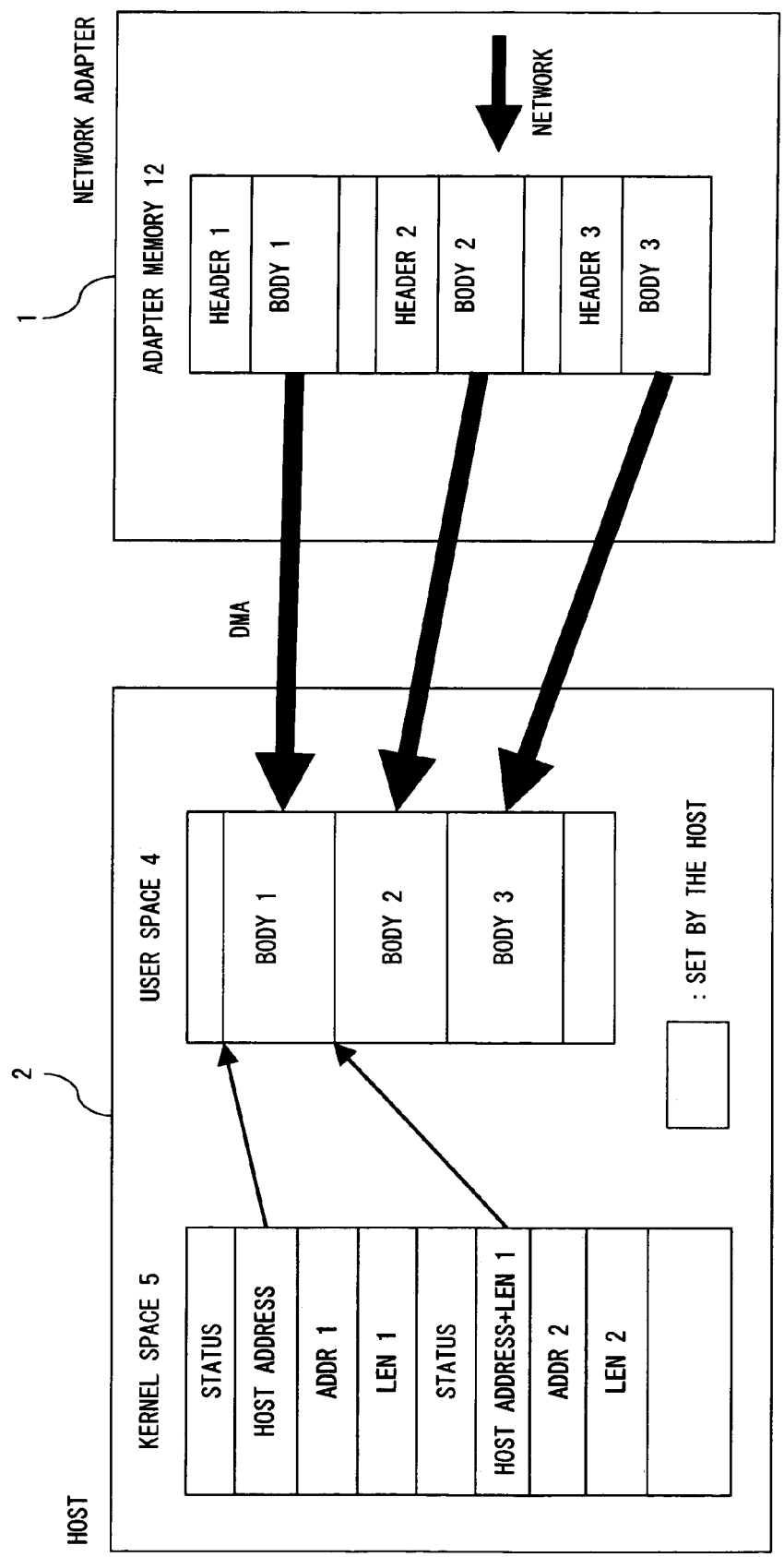
FIG. 8 shows the basic operation of transferring the data section of fragments, using descriptors.

FIG. 8 shows the basic operation of transferring the data sections of fragments, using descriptors. As described with reference to FIG. 7, if being notified of information needed for DMA transfer from management information generated by the network adapter 1, the host computer 2 generates descriptors to be used for DMA transfer, based on the notified information. After the host computer 2 generates DMA descriptors, the DMA engine of the network adapter 1 performs the DMA transfer processes of the data sections of a packet according to the descriptors.

A descriptor for transferring the data section of one fragment comprises a status, the writing destination host address of the data section (storage destination starting address in the host computer 2), the transmitting source storage address of the data section (storage address of the adapter memory 12 of the network adapter 1) and the data length of the data section. In this preferred embodiment, the host computer 2 sets the writing destination host address, transmitting source address and data length, according to the management information notified by the network adapter 1.

The leading address of a storage destination in the host computer 2 is the leading address of the data section in the user space 4 of the host computer 2. The transmitting source address is the leading address of data section in the adapter memory 12. The data length is the size of the data section. In FIG. 8, descriptors 1 and 2, which are generated by fragments 1 and 2, respectively, are shown. In the leading address in the host computer 2, of the fragment 2, a value obtained by adding the data length of the fragment 1 to the leading address (in FIG. 8, "host address") of the fragment 1 is stored. The data section transferred to the user space 4 is sequentially and continuously stored according to the structure of a packet. The network adapter 1 sets its status value to a value indicating a "completion" status every time a DMA transfer process specified by each descriptor is completed.

Figure 10:
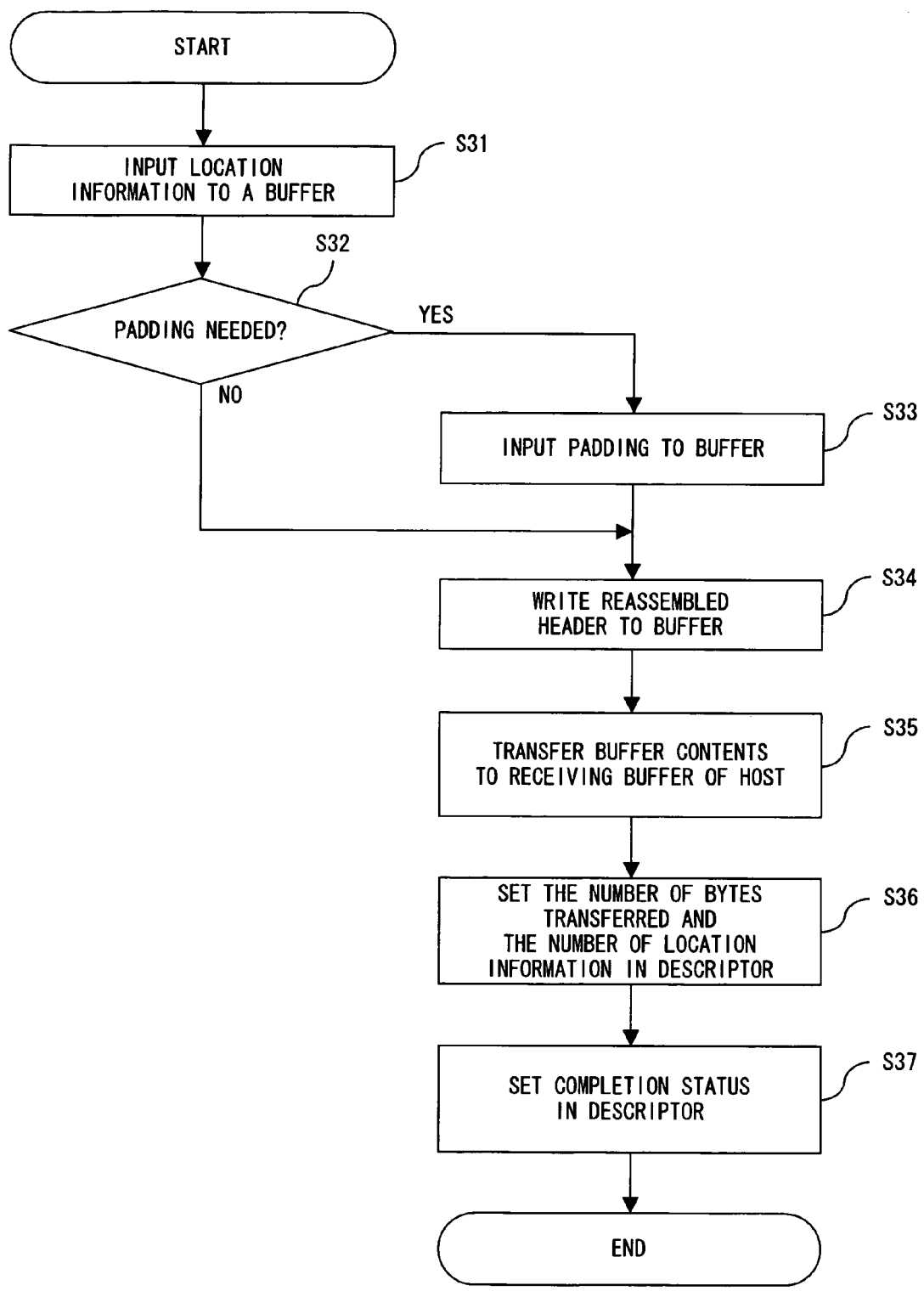
FIG. 10 is a flowchart showing the process of notifying the host computer of the reassembled header and location information.
Figure 11:
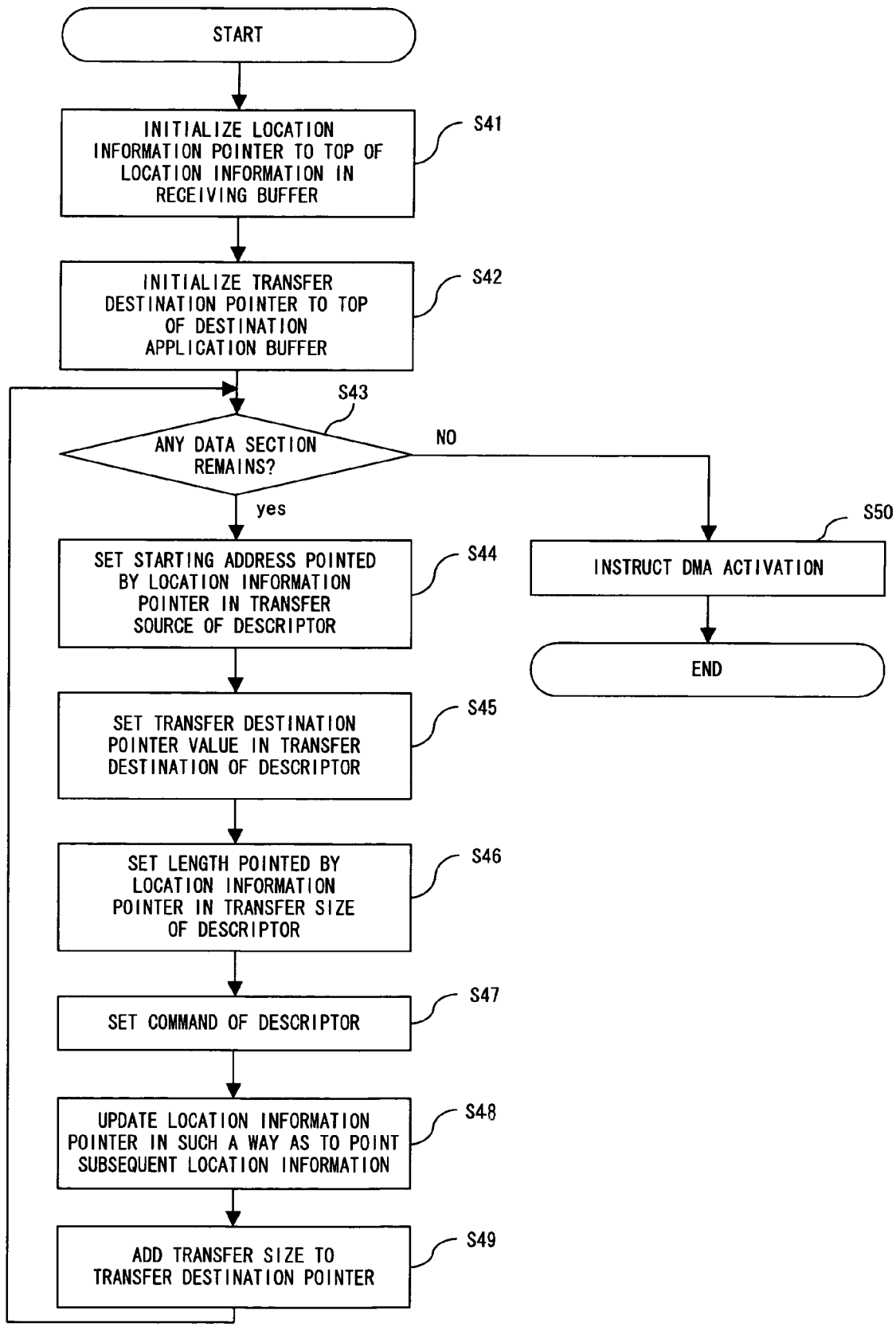
FIG. 11 is a flowchart showing the process of generating a data transfer descriptor.

FIGS. 9 through 11 are flowcharts showing the packet transfer process of this preferred embodiment. A processing method for realizing the packet transfer of this preferred embodiment is described below with reference to the drawings.

FIG. 9 is a flowchart showing the operation of the network adapter 1 which received a packet.

Firstly, in step S1, the network adapter 1 receives a packet. Then, in step S2, it is determined whether the IP header of the received packet is legal. Additionally, only when its destination IP address is that of the host computer 2, the address is determined to be legal. If the received packet is determined to be legal, in step S3, identifying information is extracted from the header section of the received packet. Since the identifying information is already described with reference to FIG. 6, its description is omitted here.

In step S4, it is determined whether the received packet is an IP fragment. If it is an IP fragment, in step S5 it is determined whether the fragment should be reassembled. For example, in this preferred embodiment, it is determined based on whether its protocol is a TCP protocol or whether data size to be transferred to the host computer is suited to implement the transfer method of the present invention.

If it is determined that the received packet should be reassembled, in step S6 it is determined whether the identifying information coincides with that of a packet previously received. If they do not coincide, in step S7 the management information of the received packet is newly generated, and the process proceeds to step S9 after initializing the "timer" of the management information. If in step S6 the identifying information coincides with that of a packet previously received, in step S8 necessary information is extracted from the received packet and the management information is updated. Then, the process proceeds to step S9. When in step S7 and S8 the management information is generated and updated, respectively, the location information (storage address and data length in the adapter memory 12) about the data section of the received packet is generated.

In step S9, the received packet is stored in the adapter memory 12. In step S10, it is determined whether the stored packet is a leading fragment. In the IP header of a leading fragment, "0" is stored as a fragment offset value, as in the case of the reassembled header described earlier with reference to FIG. 6. If it is determined that the received packet is a leading fragment, the process proceeds to step S11 and the information stored in the header of the fragment is copied to the reassembled header 30. Then, the process proceeds to step S12. If it is not a leading fragment, the step S11 is skipped and the process proceeds to step S12.

In step S12, it is determined whether all the fragments are stored in the adapter memory 12. If the storage of all the fragments is not completed yet, in step S13 it is further determined that the timer is expired. If the timer is not completed yet, the process terminates without performing a special process. If the timer is expired, in step S14, all the fragments with the same identifying information including the header are transferred to the host computer 2 and the process terminates.

If in step S12 it is determined that all the fragments are stored, in step S15 the MF of the reassembled header 30 is set to 0. Then, the "total length of the packet" and "header (IP) check-sum" are calculated and set from the management information of the fragment. In step S16, the location information of each fragment and reassembled header 30 are transferred to the host computer 2. In this case, the location information is generated for each packet in step S7 or S8, as described above. In step S17, the area storing the management information and reassembled header 30 is released, and further the timer is cleared. Then, the process terminates.

If in step S4 it is not determined that the received packet is an IP fragment or in step S5 it is not determined that it should be reassembled, the process proceeds to step S18, and in step S18 it is determined whether its identifying information coincides with that of a packet previously received. If it coincides, as to a packet whose management information is previously generated, it is determined that its management information and reassembled header 30 is generated in error due to the damage of data or the like, and in step S19 the management information, reassembled header 30 and timer related to the packet are cleared. In step S20, the received packet is transferred to the host computer 2 without performing any further process and the process terminates. If in step S2 it is not determined that the IP header is legal either, the process proceeds to step S20, and packet transfer by the reassembled header 30 is not performed.

In this preferred embodiment, the received packet that is not determined to be legal in step S2 is transferred to the host computer 2 in step S20 without being further processed. When the timer is expired in step S13, in step S14 it is transferred to the host computer 2 in a similar way. However, the present invention is not limited to this. For example, when the IP headers of fragments are not determined to be legal in step S2 (excluding the case where they are determined to be illegal for the reason that their destination IP addresses are not those of the host computer 2) or when the timer is expired in step S13, the network adapter 1 may discard all such fragments.

FIG. 10 is a flowchart showing the process of notifying the host computer 2 of the reassembled header 30 and location information 40. Firstly, in step S31, the location information 40 is written into a prescribed buffer area of the network adapter 1. In step S32, it is determined whether padding is necessary when notifying the host computer 2 of it. If no padding is necessary, the process proceeds to step S34 without being further processed. If it is necessary, the process proceeds to step S34 after putting padding in the buffer.

In step S34, the reassembled header 30 is written into a prescribed buffer area of the network adapter 1. In this case, the reassembled header 30 can also be written into a buffer different from one into which the location information 40 is written before. In step S35, the contents of the buffer, that is, the location information 40 and reassembled header 30 are transferred to the receiving buffer of the kernel space of the host computer 2. The location information 40 and reassembled header 30 are transferred, for example, according to a header transfer DMA descriptor generated by the host computer 2.

In step S36, the total number of bytes transferred (header size) of the reassembled header 30 and location information 40 and the number of the location information 40 are set in the data transfer DMA descriptor generated by the host computer 2. In step S37, a "completion" status is set as the status of the descriptor and the process terminates. In this case, the network adapter 1 performs the processes in steps S31 through S37.

FIG. 11 is a flowchart showing the process of the host computer 2 generating a data transfer descriptor for DMA-transferring the data section of a fragment. When the settings of the number of bytes transferred, location information 40 and status in the descriptor are completed as a result of the process shown in FIG. 10, the host computer 2 further sets the transfer source address, transfer destination address, number of bytes, a command and the like, and performs the DMA transfer of the data section of the fragment.

Firstly, in step S41, a pointer for reading the location information 40 is initialized. In this case, the network adapter 1 transmits the location information 40 by the process shown in the flowchart of FIG. 9. At this time, the leading address of the location information 40, contained in the receiving buffer in the kernel space 5 is set. Then, in step S42, a transfer destination pointer is initialized. At this time, the leading address of the application buffer (user space 4) of the host computer 2 is set.

In step S43, it is determined whether un-transferred data still exists in the adapter memory 12, based on whether the pointer for reading the location information 40 has reached the end of the location information 40. If un-transferred data exists, the process proceeds to step S44. In the step S44, the leading address of the data section which is set in the location information 40 pointed by the pointer for reading the location information 40 as the transfer source (corresponding to the transfer source address shown in FIG. 8) of the descriptor. In step S45, the address pointed by the transfer destination pointer is set as the transfer destination of the descriptor (corresponding to the host address shown in FIG. 8).

In step S46, the data length of the data section, set in the location information pointed by the pointer for reading the location information 40 is set in the transfer size of the descriptor (corresponding to the data length shown in FIG. 8). In step S47, the command of the descriptor is set. The network adapter 1 drives a DMA engine, according to the received command. In step S48, the pointer for reading the location information 40 is updated in such a way as to point subsequent location information 40. In step S49, a result obtained by adding the transfer size set in step S46 to the transfer destination pointer is reset in the transfer destination pointer, and the process returns to step S43.

After that, the processes in steps S43 through S49 are repeated. When there remains no data section of a fragment stored in the adapter memory 12, the process proceeds to step S50. In step S50, it is determined that a descriptor is set in all fragments to transfer, and the network adapter 1 is instructed to activate the DMA. Then, the process terminates.

As described above, according to the communication system including the network adapter 1 of the preferred embodiment, the network adapter 1 logically organizes fragments and reassembles the packet. Then, the network adapter 1 notifies the host computer 2 of its header (reassembled header 30) together with the location information 40 (information indicating the leading address and data length of the adapter memory 12 of each fragment). The host computer 2 can perform a DMA-transfer of the data section, based on the information about the leading address and data length of each fragment. In this case, since the data section of the received packet is directly transferred from the network adapter 1 to the user space 4 of the memory of the host computer 2, no memory-to-memory copy is needed in the host computer 2. Accordingly, the efficiency in use of memory can be improved. In the host computer 2, a receiving buffer can be easily managed by protocol processing software.

In the communication system 10 of the preferred embodiment, the network adapter 1 separates the header section of each received packet from its data section, and only the reassembled header 30 generated based on the header section and the location of each data section are transferred to the receiving buffer area of the kernel space 5 of the host computer 2 separately from the data section. In this case, since the amount of the data of the reassembled header 30 and the location information 40 of each data section which are written into this receiving buffer area is sufficiently small compared with a general MTU (for example, 1,500 bytes), there is no need to prepare a special data area in order to realize the transfer method of the present invention.

Although in the above-mentioned preferred embodiments a received packet is an IP fragment, it is not limited to this. For example, by providing a means for reassembling a plurality of received TCP packets (segments), logically organizing it into a large TCP packet (segment) and notifying a host computer of the leading address in the adapter memory and data size, of each segment together with the reassembled header, packets can be transferred as in the above-mentioned preferred embodiments.

What is claimed is:

1. A network adapter for transferring a plurality of packets received via a network to a host computer, comprising:
   a separation unit for dividing each received packet into a header section and a data section;
   a storage unit for storing data section of each packet divided by the separation unit;
   a generation unit for generating a new header, based on the header section of each of the plurality of packets;
   a notification unit for notifying the host computer of the new header and a plurality of pieces of location specifying information indicating a storage position of each of a plurality of data sections stored in the storage unit; and
   a transfer unit for reading the plurality of data sections from the storage unit and transferring said data sections to the host computer, according to a transfer instruction generated using the location specifying information in the host computer.

2. The network adapter according to claim 1, wherein
   the notification unit transmits the new header and the location specifying information to a kernel space of memory in the host computer, and
   the transfer unit transfers the plurality of data sections to a user space of memory in the host computer.

3. The network adapter according to claim 1, wherein
   the notification unit transmits the new header and the location specifying information to a prescribed area of the kernel space according to a DMA descriptor written in the kernel space.

4. The network adapter according to claim 1, wherein
   the notification unit notifies the host computer of the number of a plurality of pieces of location specifying information in addition to the new header and the location specifying information.

5. The network adapter according to claim 4, wherein
   the notification unit transmits the new header to a top of a buffer area beforehand prepared in the memory of the host computer, transmits the plurality of pieces of location specifying information to a prescribed position of the buffer area and notifies the host computer of a transmitting destination address of this location specifying information.

6. The network adapter according to claim 4, wherein
   the notification unit transmits the new header to a top of a buffer area beforehand prepared in the memory of the host computer and the plurality of pieces of location specifying information to a end of the buffer area.

7. The network adapter according to claim 4, wherein
   the notification unit writes the plurality of pieces of location specifying information into a top of a buffer area beforehand prepared in the memory of the host computer and the new header into a subsequent area.

8. The network adapter according to claim 1, wherein
   the plurality of packets is obtained by dividing one packet in a transmitting apparatus.

9. The network adapter according to claim 1, wherein
   the location specifying information contains information indicating data length of each corresponding data section.

10. The network adapter according to claim 1, wherein
    when the transfer unit transfers all the plurality of data sections to the host computer, the storage unit discards all corresponding header sections.

11. The network adapter according to claim 1, wherein
    the new header comprises a flag for indicating whether all the plurality of data sections are stored in the storage unit, and
    when recognizing that all the plurality of data sections are stored in the storage unit based on the flag, the notification unit starts transferring the new header and the location specifying information to the host computer.

12. The network adapter according to claim 1, further comprising:
    a timer unit for measuring time, after receiving a first packet of the plurality of packets, until receiving a last packet, wherein
    when time measured by the timer unit exceeds a predetermined time, the transfer unit transfers the received packets to the host computer.

13. A communication system including a host computer and a network adapter for transferring a plurality of packets received via a network to the host computer,
    the network adapter comprising:
       a separation unit for dividing each received packet into a header section and a data section;
       a storage unit for storing data section of each packet divided by the separation unit;
       a generation unit for generating a new header, based on the header section of each of the plurality of packets;
       a notification unit for notifying the host computer of the new header and a plurality of pieces of location specifying information indicating a storage position of each of a plurality of data sections stored in the storage unit; and
       a transfer unit for reading the plurality of data sections from the storage unit and transferring said data sections to the host computer, according to a transfer instruction generated using the location specifying information in the host computer, and
    wherein
       the host computer assembles the plurality of data sections, based on the new header.

14. The communication system according to claim 13, wherein
    the host computer generates a DMA descriptor to be executed by the network adapter as the transfer instruction, according to the plurality of pieces of location specifying information notified by the network adapter.

15. A communication method for transferring a plurality of packets received via a network to a host computer, comprising:
    dividing each received packet into a header section and a data section;
    storing data section of each packet in a storage unit;
    generating a new header, based on the header section of each of the plurality of packets;
    notifying the host computer of the new header and a plurality of pieces of location specifying information indicating a storage position of each of the plurality of data sections stored in the storage unit; and
    reading the plurality of data sections from the storage unit and transferring said data sections to the host computer, according to a transfer instruction generated using the location specifying information in the host computer.

* * * * *